(12) United States Patent
Meckes et al.

(10) Patent No.: US 6,651,692 B2
(45) Date of Patent: Nov. 25, 2003

(54) MODULAR OXYGEN SUPPLY SYSTEM

(75) Inventors: Rüdiger Meckes, Berkenthin (DE);
Herbert Meier, Lübeck (DE);
Wolfgang Rittner, Siblin (DE)

(73) Assignee: Dräger Aerospace GmbH, Lübeck (DE)

( * ) Notice: Subject to any disclaimer, the term of this patent is extended or adjusted under 35 U.S.C. 154(b) by 20 days.

(21) Appl. No.: 10/131,715

(22) Filed: Apr. 24, 2002

(65) Prior Publication Data

US 2003/0010382 A1 Jan. 16, 2003

(51) Int. Cl.[7] .................................................. F17D 1/04
(52) U.S. Cl. ......................... 137/269; 137/271; 137/884
(58) Field of Search ................................. 137/269, 271, 137/884

(56) References Cited

U.S. PATENT DOCUMENTS

| | | | | |
|---|---|---|---|---|
| 5,222,524 A | * | 6/1993 | Sekler et al. ................ | 137/884 |
| 5,605,179 A | * | 2/1997 | Strong, Jr. et al. ........... | 137/884 |
| 6,068,016 A | * | 5/2000 | Manofsky, Jr. et al. ....... | 137/269 |
| 6,109,303 A | * | 8/2000 | Itafuji et al. ................. | 137/884 |

* cited by examiner

Primary Examiner—Kevin Lee
(74) Attorney, Agent, or Firm—McGlew and Tuttle, P.C.

(57) ABSTRACT

A modular oxygen supply system is provided comprising at least one module skeleton with a baseplate with frames arranged in parallel to one another. The system includes supply lines for ambient air with air connections for taking off the air, first gas lines for oxygen with first gas connections for taking up the oxygen and second gas lines for outgoing air with second gas connections for taking up outgoing air. Rack guides with data lines are provided. At least one individual module can be pushed into the module skeleton. Each individual module has at least one molecular sieve container fastened on a baseplate with the gas connections and with an electric contact. Each individual module has a gas treatment unit for the ambient air fed in. A pressure reducer and a multiple-way valve as well as an oxygen reservoir are arranged downstream of the molecular sieve container or containers connected in parallel. Each individual module is pushed into the module skeleton and is connected via the gas connections to a supply line for the ambient air, to a first gas line for oxygen and to a second gas line for the outgoing air. The electric contact of the individual module is connected to the data line of the module skeleton.

18 Claims, 1 Drawing Sheet

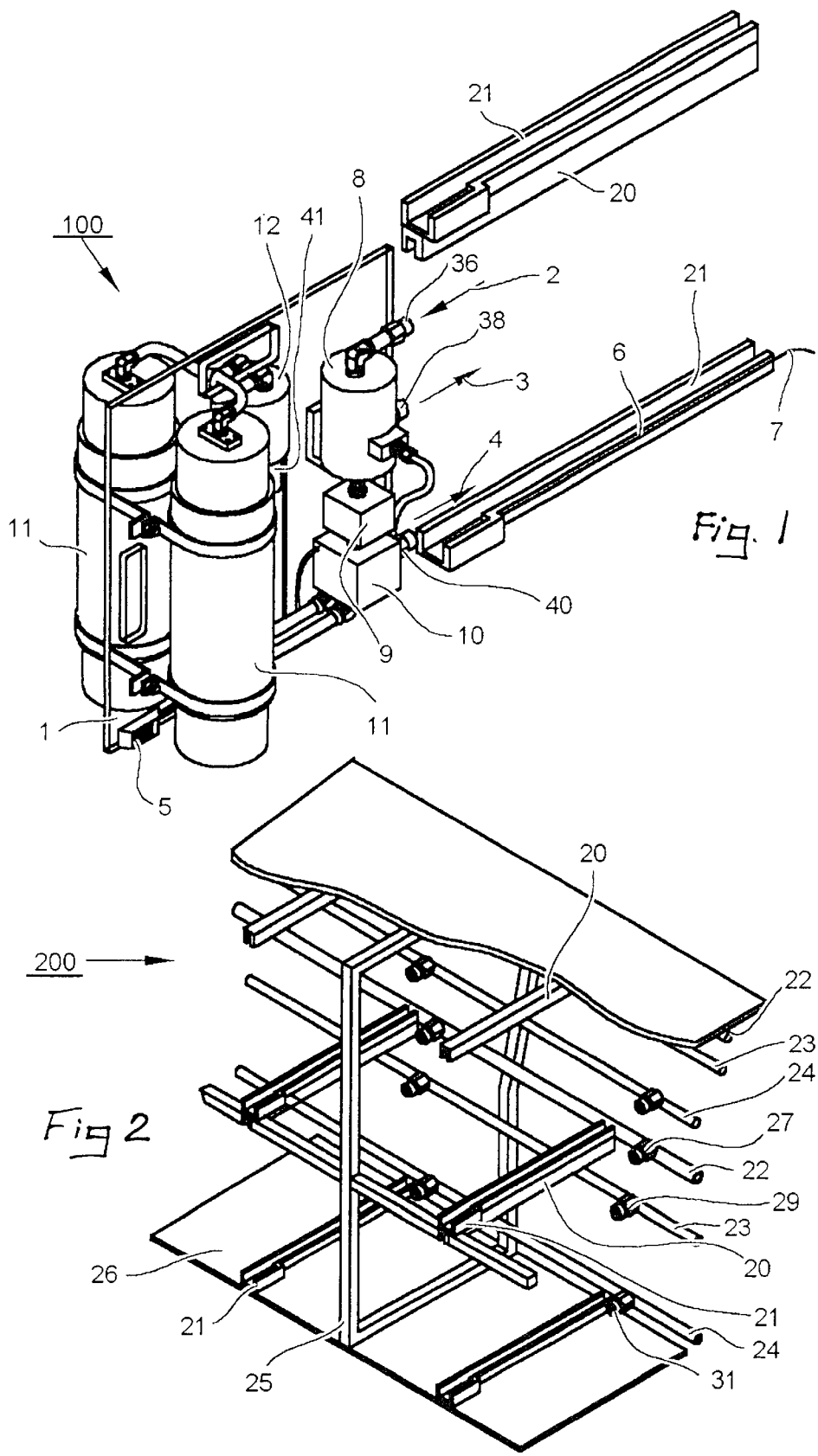

MODULAR OXYGEN SUPPLY SYSTEM

FIELD OF THE INVENTION

The present invention pertains to a modular oxygen supply system generally and also to a modular oxygen supply system used onboard airplanes to supply the crew and the passengers with oxygen.

BACKGROUND OF THE INVENTION

An oxygen supply system of modular design for industrial applications has become known from U.S. Pat. No. 5,605,179 entitled "Integrated Gas Panel." A plurality of modules of such a system are connected in a compact arrangement via gas lines.

Oxygen generators, which are used to supply the crew and the passengers with oxygen, have been used onboard airplanes for some time. Also known are oxygen generators that concentrate the oxygen from the ambient air, especially the tapped air of the engine, by means of pressure change adsorption, so that product gas enriched with oxygen is subsequently fed into the breathing air. The prior-art oxygen generators are dimensioned corresponding to the size of the crew and the possible passenger capacity of the particular aircraft model and are permanently installed there.

SUMMARY OF THE INVENTION

The object of the present invention is to provide a modular oxygen supply system, which can be flexibly adapted to the particular needs of an aircraft.

According to the invention, a modular oxygen supply system is provided comprising at least one module skeleton with a baseplate with frames arranged in parallel to one another. The system includes supply lines for ambient air with air connections for taking off the air, first gas lines for oxygen with first gas connections for taking up the oxygen and second gas lines for outgoing air with second gas connections for taking up outgoing air. Rack guides with data lines are provided. At least one individual module can be pushed into the module skeleton. Each individual module has at least one molecular sieve container fastened on a baseplate with the gas connections and with an electric contact. Each individual module has a gas treatment unit for the ambient air fed in. A pressure reducer and a multiple-way valve as well as an oxygen reservoir are arranged downstream of the molecular sieve container or containers connected in parallel. Each individual module is pushed into the module skeleton and is connected via the gas connections to a supply line for the ambient air, to a first gas line for oxygen and to a second gas line for the outgoing air. The electric contact of the individual module is connected to the data line of the module skeleton.

A plurality of the individual modules may be arranged in a module skeleton in parallel to one another and at right angles to the supply lines and the first gas lines and the second gas lines of the module skeleton.

The gas connections of each of the individual modules and the air connections and the first and second gas connections of the module skeleton may be designed as cooperating plug-in connections. Both the air connection and the gas connections of the module skeleton and the gas connections of each individual module may have a self-sealing design, so that the connections open only when the individual module is pushed into the module skeleton and is connected to same.

The electric connection of the electric contact of each individual module to the data line of the module skeleton is designed as an electric plug-in connection. The plug-in connections between the gas-carrying lines of each of the individual modules to those of the module skeleton may also be used for the electric contacting between the electric contact and the data line.

One essential advantage of the modular oxygen supply system according to the present invention is the possibility of flexible adaptation of the oxygen supply due to the use of individual modules in a special module skeleton. Thus, the oxygen supply system is adapted to the needs of the aircraft within the framework of the maximum plug-in place capacity, which is predetermined by the module skeleton, by plugging more or fewer individual modules into the module skeleton. When every individual module is plugged into the module skeleton, the necessary connections to the pneumatic and electric lines are established by outlets. Both the electrical and the pneumatic connections are preferably established simultaneously with the plugging-in operation by using combined electric-pneumatic plug-in connections.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 1 is a perspective view showing some components of a modular oxygen supply system including an individual module with upper and lower rack guides for receiving an individual module; and FIG. 2 is a perspective view showing a module skeleton for receiving individual modules.

DESCRIPTION OF THE PREFERRED EMBODIMENTS

Referring to the drawings in particular, an exemplary embodiment of the present invention will be explained on the basis of the of FIGS. 1 and 2, which show the essential components of a modular oxygen supply system, namely, an individual module 100 in FIG. 1 with upper and lower rack guides 20, 21 for receiving individual modules 100 in the module skeleton 200 shown in FIG. 2.

Each individual module 100 has at least one molecular sieve container 11 each, two such containers in the example, which are needed for carrying out the pressure change adsorption for releasing the oxygen. The two molecular sieve containers 11 connected in parallel in the exemplary embodiment are filled with a zeolite, which allows oxygen 3 selectively to pass through and adsorbs especially nitrogen as the principal constituent of the air, so that oxygen 3 is released with a degree of concentration of about 94% as a product gas. The individual components of each individual module 100 are fastened on a baseplate 1 made of a plastic or aluminum. Ambient air 2 is fed in under pressure via corresponding supply lines 22. The concentrated oxygen 3 isolated from the ambient air 2 as well as the outgoing air 4 released by the process are released through corresponding first gas lines 23 to the user sites for oxygen 3 or through second gas lines 24 into the environment.

Dust, moisture and water are removed from the ambient air 2 fed in, in a gas treatment unit 8. A pressure reducer 9, an electrically controlled multiple-way valve 10 and the two molecular sieve containers 11 connected in parallel with an oxygen reservoir 12 are arranged downstream of the gas treatment unit 8. For a certain cycle time, corresponding to the pressure change adsorption process, one molecular sieve container 11 is filled with ambient air 2 and it releases oxygen 3, which is sent into the oxygen reservoir 12, on the one hand, and flows into the second molecular sieve container 11, on the other hand, in order to draw off the desorbed nitrogen from the loaded zeolite as outgoing air 4 until the next process cycle of the pressure change adsorption begins with the regenerated second molecular sieve container 11 as the oxygen concentrator. If only one molecular sieve container 11 is used per individual module 100, the molecular sieve containers 11 of different individual modules 100 assume the respective complementary functions of adsorption and desorption. The oxygen reservoir 12 can be eliminated as a separate, discrete component if the downstream pipeline system has a correspondingly large volume and thus assumes the function of the oxygen reservoir 12.

The electric contact 5 of each individual module 100 is made via a complementary contact of the corresponding lower rack guide 21 of the module skeleton 200 at the rack. Both status data of each individual module 100 and control data are exchanged with a central evaluating and control unit 7. The individual modules 100 monitor themselves automatically by means of measuring sensors (oxygen measurement, gas volume flow measurement, gas pressure), so that if the oxygen product quality, measured by an $O_2$ sensor, is incorrect, the individual module 100 in question is switched off pneumatically and is not connected to the rest of the oxygen supply system until the measured oxygen product quality again becomes error-free. The defective module optionally generates a maintenance analysis signal, which is used, e.g., by a computer bus or conventional electronic signal receivers, and the module continues to operate without being switched off. Defective modules can be easily replaced by pulling out the defective module and plugging in a new module. The oxygen production capacity can likewise be adapted by adding or removing individual modules 100 to or removing from the module skeleton 200. This may be necessary when, e.g., the number of seats of a passenger airplane is changed.

The module skeleton 200 is formed by frames 25 fastened on a baseplate 26. Individual modules 100, arranged one on top of another, are pushed into corresponding module guides 20, 21 between two frames 25 made of, e.g., aluminum. The supply lines 22 for ambient air with air connections 27 as well as the first gas lines 23 with first gas connections 29 and the second gas lines 24 with second gas connections 31 are likewise led at the frame 25. The gas connection between the gas-carrying lines and the individual modules 100 is preferably established by means of plug-in connections, which optionally also establish the electrical contacting to the data lines 6. The plug-in connections between the gas-carrying lines and the individual modules 100 are designed especially as doubly self-sealing lines, so that an unused module plug-in site is automatically pneumatically sealed and build-up of pressure can take place in the supply lines 22 and in the first and second gas lines 23, 24. At the same time, the individual modules 100 are pneumatically sealed as long as they are not mounted in the module skeleton 200, so that no moisture can enter the module from the outside and destroy the hygroscopic zeolite material, e.g., during transportation or during storage.

For example, 15 individual modules 100 are needed for an airplane carrying 500 passengers in order to supply the passengers with oxygen at an altitude of 20,000 ft. Two individual modules 100 are also carried as redundant units in order to guarantee the full capacity of the oxygen supply system in case of failure, i.e., the failure of two individual modules 100. Each individual module 100 is dimensioned such that an oxygen enrichment of at least 45 vol. % is reached at a released normal volume flow of 140 L per minute.

While a specific embodiment of the invention has been shown and described in detail to illustrate the application of the principles of the invention, it will be understood that the invention may be embodied otherwise without departing from such principles.

What is claimed is:

1. A modular oxygen supply system comprising:
   a module skeleton with a baseplate with frames arranged in parallel to one another and with supply lines for ambient air with air connections for taking off the air, first gas lines for oxygen with first gas connections for taking up the oxygen and second gas lines for outgoing air with second gas connections for taking up the outgoing air as well as with rack guides with data lines; and
   an individual module which can be pushed into said module skeleton, said individual module having at least one molecular sieve container fastened on a baseplate with gas connections and with an electric contact as well as with a gas treatment unit for the ambient air fed in, a pressure reducer and with a multiple-way valve as well as with an oxygen reservoir arranged downstream of the molecular sieve container, said individual module pushed into the module skeleton being connected via the gas connections to the supply line for ambient air, to the first gas line for oxygen and to the second gas line for the outgoing air, and the electric contact of the individual module is connected to the data line of the module skeleton.

2. A modular oxygen supply system in accordance with claim 1, wherein a plurality of individual modules are arranged in the module skeleton in parallel to one another and at right angles to the supply lines, the first gas lines and the second gas lines of the module skeleton.

3. A modular oxygen supply system in accordance with claim 1, wherein the gas connections of the individual module and the air connections and said first and second gas connections of the module skeleton are cooperating plug-in connections.

4. A modular oxygen supply system in accordance with claim 1, wherein both the air connection and the gas connections of the module skeleton and the gas connections of the individual module are of a self-sealing design, so that the connections open only when the individual module is pushed into the module skeleton and is connected to same.

5. A modular oxygen supply system in accordance claim 1, wherein the electric connection of the electric contact of each individual module to the data line of the module skeleton is designed as an electric plug-in connection.

6. A modular oxygen supply system in accordance with claim 3, wherein the plug-in connections between the gas-carrying lines of the individual module to those of the module skeleton are also used for the electric contacting between the electric contact and the data line.

7. A modular oxygen supply system comprising:
   a module skeleton with a baseplate with frames arranged in parallel to one another and with supply lines for ambient air with air connections for taking off the air, first gas lines for oxygen with first gas connections for taking up the oxygen and second gas lines for outgoing air with second gas connections for taking up outgoing air as well as with rack guides with data lines;

a first individual module which can be pushed into first and second rack guides of the module skeleton, said first individual module having a molecular sieve container fastened on a baseplate with gas connections and with an electric contact as well as with a gas treatment unit for the ambient air fed in, a pressure reducer and with a multiple-way valve as well as with an oxygen reservoir arranged downstream of the molecular sieve container, said first individual module pushed into the module skeleton being connected via the gas connections to the supply line for ambient air, to the first gas line for oxygen and to the second gas line for the outgoing air, and the electric contact of the individual module is connected to the data line of the module skeleton; and a second individual module which can be pushed into second and third rack guides of the module skeleton, said second individual module having a molecular sieve container fastened on a baseplate with gas connections and with an electric contact as well as with a gas treatment unit for the ambient air fed in, a pressure reducer and with a multiple-way valve as well as with an oxygen reservoir arranged downstream of the molecular sieve container, said second individual module pushed into the module skeleton being connected via the gas connections to the supply line for ambient air, to the first gas line for oxygen and to the second gas line for the outgoing air, and the electric contact of the individual module is connected to the data line of the module skeleton.

8. A modular oxygen supply system in accordance with claim 7, wherein the first individual module and the second individual module are arranged in the module skeleton in parallel to one another and at right angles to the supply lines, the first gas lines and the second gas lines of the module skeleton.

9. A modular oxygen supply system in accordance with claim 7, wherein the gas connections of the first individual module and second individual module and the air connections and the first and the second gas connections of the module skeleton are cooperating plug-in connections.

10. A modular oxygen supply system in accordance with claim 7, wherein both the air connection and the gas connections of the module skeleton and the gas connections of the first individual module and the second individual module are of a self-sealing design, whereby the connections open only when the respective first individual module or the second individual module are pushed into the module skeleton and connected to the module skeleton.

11. A modular oxygen supply system in accordance with claim 7, wherein the electric connection of the electric contact of each of the first individual module or the second individual module to the data line of the module skeleton is an electric plug-in connection.

12. A modular oxygen supply system in accordance with claim 9, wherein the plug-in connections between the gas-carrying lines of the first individual module or the second individual module to those of the module skeleton are also used for the electric contacting between the electric contact and the data line.

13. A modular oxygen supply system comprising:

a module skeleton with a baseplate with frames arranged in parallel to one another and with supply lines for ambient air with air connections for taking off the air, first gas lines for oxygen with first gas connections for taking up the oxygen and second gas lines for outgoing air with second gas connections for taking up outgoing air as well as with rack guides with data lines; and an individual module which can be pushed into said module skeleton, said individual module having a first molecular sieve container and a second molecular sieve container fastened on a baseplate and connected in parallel with gas connections and with an electric contact as well as with a gas treatment unit for the ambient air fed in, a pressure reducer and with a multiple-way valve as well as with an oxygen reservoir arranged downstream of the molecular sieve containers connected in parallel, said individual module pushed into the module skeleton being connected via the gas connections to the supply line for ambient air, to the first gas line for oxygen and to the second gas line for the outgoing air, and the electric contact of the individual module is connected to the data line of the module skeleton.

14. A modular oxygen supply system in accordance with claim 13, wherein a plurality of individual modules are arranged in the module skeleton in parallel to one another and at right angles to the supply lines, the first gas lines and the second gas lines of the module skeleton.

15. A modular oxygen supply system in accordance with claim 13, wherein the gas connections of the individual module and the air connections and said first and second gas connections of the module skeleton are cooperating plug-in connections.

16. A modular oxygen supply system in accordance with claim 13, wherein both the air connection and the gas connections of the module skeleton and the gas connections of the individual module are of a self-sealing design, so that the connections open only when the individual module is pushed into the module skeleton and is connected to same.

17. A modular oxygen supply system in accordance claim 13, wherein the electric connection of the electric contact of each individual module to the data line of the module skeleton is designed as an electric plug-in connection.

18. A modular oxygen supply system in accordance with claim 15, wherein the plug-in connections between the gas-carrying lines of the individual module to those of the module skeleton are also used for the electric contacting between the electric contact and the data line.

* * * * *